(12) United States Patent
Zhong et al.

(10) Patent No.: US 10,584,776 B2
(45) Date of Patent: Mar. 10, 2020

(54) HIGH-EFFICIENCY HIGH-THRUST ELECTRIC LINEAR ACTUATOR FOR SOLAR PANEL

(71) Applicant: Dongguan Tomuu Actuator Technology Co., Ltd., Dongguan (CN)

(72) Inventors: Hanwan Zhong, Fujian (CN); Ming Liu, Hubei (CN)

( * ) Notice: Subject to any disclaimer, the term of this patent is extended or adjusted under 35 U.S.C. 154(b) by 0 days.

(21) Appl. No.: 16/182,630

(22) Filed: Nov. 7, 2018

(65) Prior Publication Data

US 2019/0113116 A1    Apr. 18, 2019

(30) Foreign Application Priority Data

Aug. 8, 2018  (CN) .......................... 2018 1 0894826

(51) Int. Cl.
| | |
|---|---|
| *F16H 3/06* | (2006.01) |
| *F16H 27/02* | (2006.01) |
| *F16H 29/02* | (2006.01) |
| *F16H 29/20* | (2006.01) |
| *F16H 25/20* | (2006.01) |
| *F16H 1/20* | (2006.01) |
| *F16H 57/021* | (2012.01) |
| *F16H 25/24* | (2006.01) |
| *H02S 20/30* | (2014.01) |
| *H02K 7/06* | (2006.01) |

(Continued)

(52) U.S. Cl.
CPC ........... *F16H 25/2056* (2013.01); *F16H 1/20* (2013.01); *F16H 25/24* (2013.01); *F16H 57/021* (2013.01); *H02K 7/06* (2013.01); *H02S 20/30* (2014.12); *F16H 2025/2031* (2013.01); *F16H 2025/2081* (2013.01); *F16H 2025/249* (2013.01); *F16H 2057/02034* (2013.01); *F24S 2030/115* (2018.05); *F24S 2030/134* (2018.05)

(58) Field of Classification Search
CPC ............................. F16H 2025/249; C22C 9/04
See application file for complete search history.

(56) References Cited

U.S. PATENT DOCUMENTS

| | | | | |
|---|---|---|---|---|
| 2009/0095493 A1* | 4/2009 | Johnson | ................. | A62C 37/16 169/19 |
| 2009/0205465 A1* | 8/2009 | Shiga | ..................... | C22C 38/18 74/841 |

(Continued)

*Primary Examiner* — Jake Cook
(74) *Attorney, Agent, or Firm* — Prakash Nama; Global IP Services, PLLC

(57) ABSTRACT

The present invention relates to the field of linear actuators, and in particular, to a high-efficiency high-thrust electric linear actuator for a solar panel. Compared with a conventional electric linear actuator, in the electric linear actuator for a solar panel of the present invention, a drive nut on a screw uses a copper alloy nut. The copper alloy nut used in the present invention greatly improves the strength, toughness, and fatigue-resistance performance and has high hardness and high tensile strength. The copper alloy nut and the corresponding screw are used in combination to bear higher pressure and do not fracture easily. Therefore, a small-structure high-thrust electric linear actuator can be realized. An electric linear actuator having a smaller volume is used to support the solar panel, so that small space is occupied, and transportation and use become more convenient.

8 Claims, 4 Drawing Sheets

(51) Int. Cl.
*F24S 30/00* (2018.01)
*F16H 57/02* (2012.01)

(56) References Cited

U.S. PATENT DOCUMENTS

| | | | | |
|---|---|---|---|---|
| 2009/0263272 A1* | 10/2009 | Uchida | ................... | C22C 9/04 |
| | | | | 420/471 |
| 2010/0006304 A1* | 1/2010 | Johnson | ................ | A62C 37/16 |
| | | | | 169/19 |
| 2012/0237393 A1* | 9/2012 | Murray | ................... | C22C 1/02 |
| | | | | 420/473 |
| 2013/0294965 A1* | 11/2013 | Sahoo | ................... | C22B 9/103 |
| | | | | 420/473 |
| 2014/0147332 A1* | 5/2014 | Murray | ................... | C22C 9/04 |
| | | | | 420/473 |
| 2014/0234156 A1* | 8/2014 | Uchida | ................... | C22C 9/04 |
| | | | | 420/471 |
| 2015/0259813 A1* | 9/2015 | Kodama | ................ | C09D 4/00 |
| | | | | 428/648 |
| 2016/0130685 A1* | 5/2016 | Huang | ................... | C22F 1/08 |
| | | | | 419/10 |
| 2016/0201164 A1* | 7/2016 | Oishi | ....................... | C22C 9/04 |
| | | | | 420/471 |
| 2016/0215366 A1* | 7/2016 | Uchida | ................... | C22C 9/04 |
| 2016/0235073 A1* | 8/2016 | Murray | .................. | A01N 59/20 |
| 2016/0340759 A1* | 11/2016 | Nilsson | ................... | C22C 9/04 |
| 2017/0145549 A1* | 5/2017 | Plett | ....................... | F16C 33/12 |

* cited by examiner

HIGH-EFFICIENCY HIGH-THRUST ELECTRIC LINEAR ACTUATOR FOR SOLAR PANEL

BACKGROUND OF THE INVENTION

The present invention relates to the field of linear actuators, and in particular, to a high-efficiency high-thrust electric linear actuator for a solar panel.

An electric linear actuator, also known as a linear driver, is a novel linear actuation mechanism that mainly includes a motor linear actuator, a control apparatus, etc. Its main working principle is that the motor drives a lead screw to rotate. A drive nut is disposed on the lead screw, which is driven to reciprocate when the lead screw rotates, while a worm gear-worm mechanism is usually used between the motor and the lead screw to implement transmission. A common electric linear actuator uses the worm gear and worm for transmission. In particular, a worm on a gear of a motor actuates a worm gear to rotate, so as to enable a small lead screw in the worm gear to make an axial movement, and a connecting plate drives a limiting rod to make a corresponding axial movement. When a required travel is reached, a limiting block is adjusted to press a travel switch to cut off power, and the motor stops running.

An electric linear actuator is used to support a solar panel in daily life. The solar panel is supported during use and is retracted after use. Alternatively, the angle of the solar panel is adjusted according to requirements by using the support of the electric linear actuator. Currently, for a solar panel having a relatively large volume, an electric linear actuator having a relatively large structural volume is needed to provide sufficient thrust to support the solar panel. Such an electric linear actuator has a relatively large volume, occupies large space, and is heavy, resulting in inconvenience in transportation and use. The main reason is that the nuts used in the existing screw group are iron nuts, which do not have sufficient hardness to bear sufficient pressure and may fracture easily. Therefore, it is necessary to use nuts having large volumes in combination with an inner tube and an outer tube that have relatively large structures to support the solar panel.

BRIEF SUMMARY OF THE INVENTION

To resolve the foregoing problem, the present invention provides a high-efficiency high-thrust electric linear actuator for a solar panel, in which a copper alloy nut that has high hardness and bears high pressure is used in a screw group, so that an inner tube group and an outer tube group that have a small structure can be used to support a solar panel having a relatively large volume.

To achieve the foregoing objective, the technical solution used in the present invention is: A high-efficiency high-thrust electric linear actuator for a solar panel includes an inner tube group, an outer tube group, a motor group, a screw group, and a gearbox, wherein the inner tube group is inserted in the outer tube group, the motor group is disposed at one side of the outer tube group, one end of the outer tube group is in drive connection with the gearbox and the motor group, the screw group includes a screw, a thrust bearing, a bearing seat, and a copper alloy nut, the copper alloy nut is sleeved on a surface of the screw and is threaded to the surface of the screw, the bearing seat is sleeved on an upper end of the screw, the thrust bearing is sleeved on the upper end of the screw and is located at a lower end of the bearing seat, the inner tube group includes an inner tube and a lower end joint, the lower end joint is threaded to a lower end of the inner tube, the screw is inserted in the inner tube from an upper end of the inner tube, and a surface of the copper alloy nut is threaded and fixed to the upper end of the inner tube; and the copper alloy nut contains, by weight percentage: 75% to 82% of Cu, 9% to 10% of Zn, 5% to 6% of Pb, 3% to 4% of Sn, and further contains: 0.04% of Fe, 0.02% of Ni, 0.01% of Mn, and 0.01% of Sb.

Specifically, the copper alloy nut contains, by weight percentage: 81.14% of CU, 9.62% of Zn, 5.39% of Pb, and 3.81% of Sn.

Specifically, the copper alloy nut further contains, by weight percentage: 0.004% of Mg, 0.003% of S, 0.004% of Cr, 0.006% of Co, 0.009% of Bi, 0.004% of As, and 0.001% of Cd.

Specifically, a first gear, a second gear, and a third gear are fixedly disposed in the gearbox, a motor is disposed in the motor group, spiral teeth are disposed on a rotating shaft of the motor, the spiral teeth are meshed with the first gear, the second gear is meshed with the first gear, the third gear is meshed with the second gear, the bearing seat at the upper end of the screw and the center of the third gear are fixed through insertion, and the motor drives the first gear to rotate, the first gear in turn drives the second gear to rotate, and the second gear drives the third gear to rotate, so as to enable the screw to rotate.

An upper end joint is further disposed at an upper end of the gearbox, and the upper end joint is a universal joint.

The first gear, the second gear, and the third gear are fixed to the gearbox through bearings.

The screw group further includes a flat gasket and a fixing nut, the fixing nut is threaded to a lower end of the screw, and the flat gasket is sleeved on the lower end of the screw and is located at an upper end of the fixing nut.

The high-efficiency high-thrust electric linear actuator further includes a motor winding, wherein the motor winding is electrically connected to the motor in the motor group through a cable joint.

The beneficial effects of the present invention lie in that: Compared with a conventional electric linear actuator, in the electric linear actuator for a solar panel of the present invention, the drive nut on the screw uses a copper alloy nut. The copper alloy nut used in the present invention greatly improves the strength, toughness, and fatigue-resistance performance and has high hardness and high tensile strength. The copper alloy nut and the corresponding screw are used in combination to bear higher pressure and do not fracture easily. Therefore a small-structure high-thrust electric linear actuator can be realized. An electric linear actuator having a smaller volume is used to support the solar panel, so that small space is occupied, and the transportation and use become more convenient.

REFERENCE NUMERALS

1. inner tube group; 11. inner tube; 12. lower end joint; 2. outer tube group; 21. fixing seat; 3. a motor group; 4. screw group; 41. screw; 42. thrust bearing; 43. bearing seat; 44. copper alloy nut; 45. flat gasket; 46. fixing nut; 5. gearbox; 51. first gear; 52. second gear; 53. third gear; 54. upper end joint; 55. gearbox body; 56. gearbox cover; 6. motor winding; 61. cable trough; and 62. micro switch.

DETAILED DESCRIPTION OF THE INVENTION

To make the technical problems resolved by the present invention, the technical solutions, and the beneficial effects clearer and more comprehensible, the present invention is further described below in detail with reference to the accompanying drawings and embodiments. It should be understood that the specific embodiments described herein are merely illustrative of the present invention and are not intended to limit the present invention.

Figure 1:
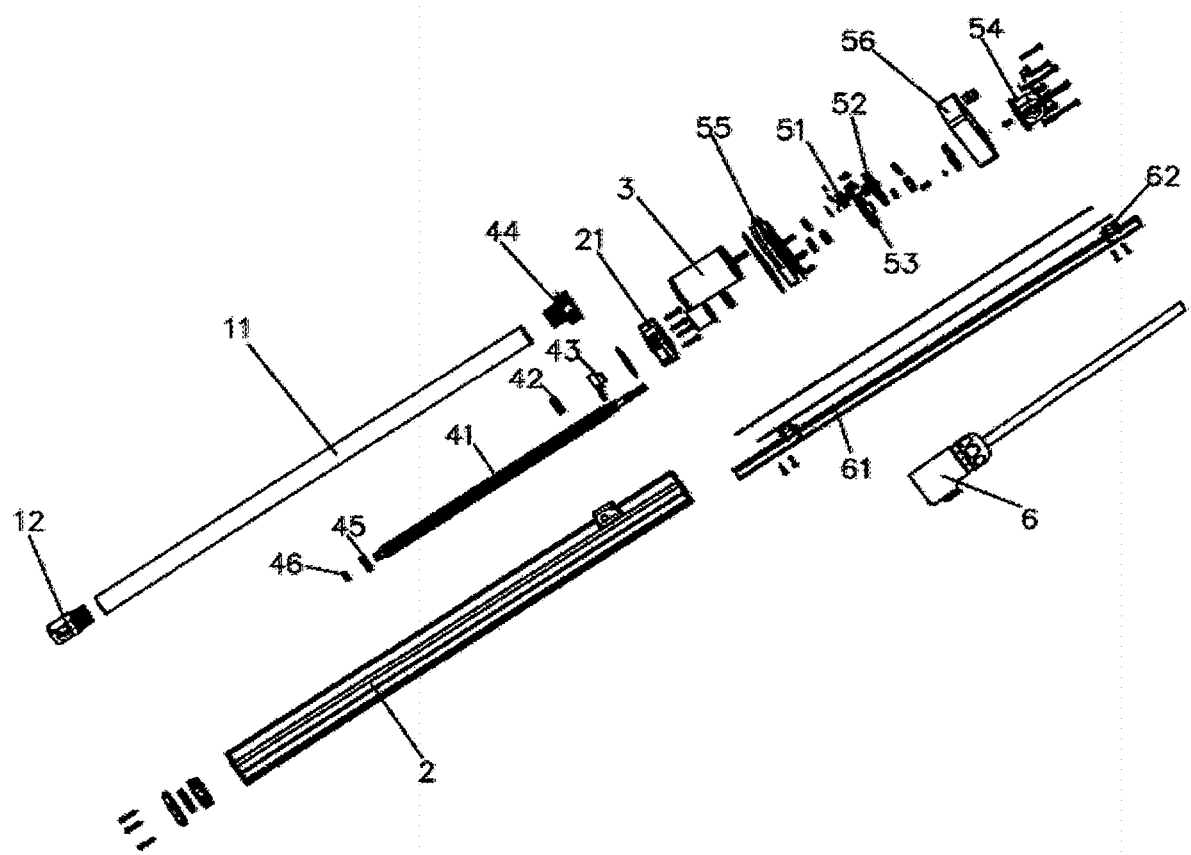
FIG. 1 is an exploded view of the present invention.
Figure 2:
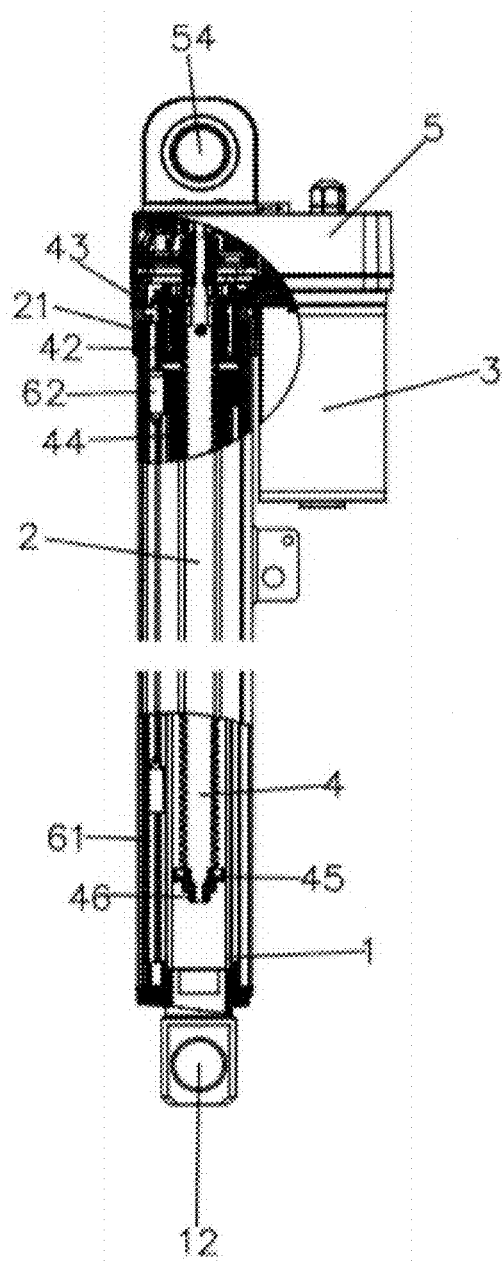
FIG. 2 is a schematic structural view of the present invention.
Figure 3:
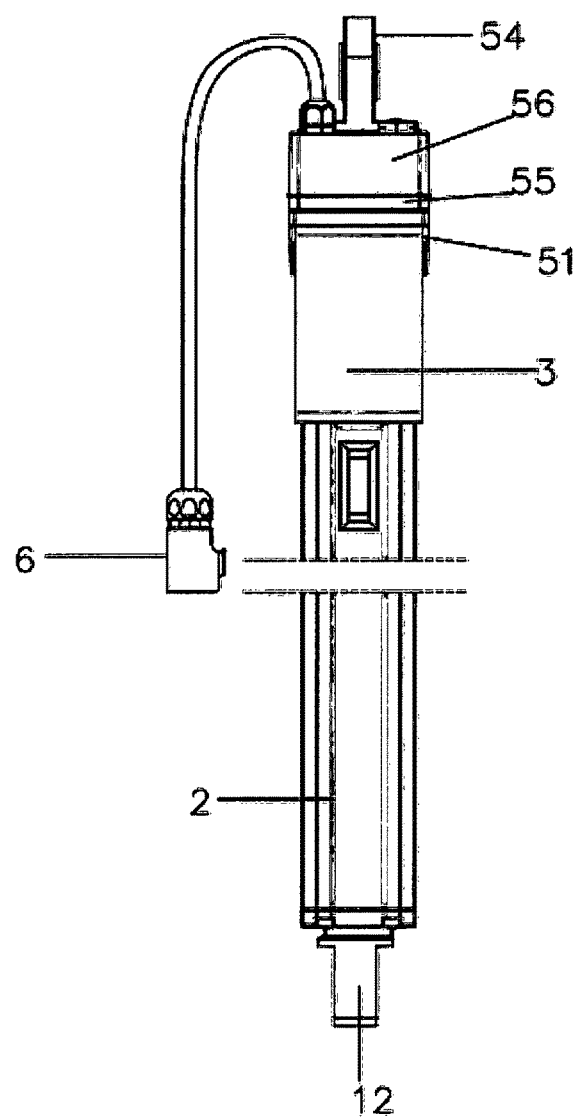
FIG. 3 is another schematic structural view of the present invention.

Referring to FIG. 1 to FIG. 3, the present invention relates to a high-efficiency high-thrust electric linear actuator for a solar panel, including an inner tube group 1, an outer tube group 2, a motor group 3, a screw group 4, and a gearbox 5. The inner tube group 1 is inserted in the outer tube group 2. The motor group 3 is disposed at one side of the outer tube group 2. One end of the outer tube group 2 is in drive connection with the gearbox 5 and the motor group 3. The screw group 4 includes a screw 41, a thrust bearing 42, a bearing seat 43, and a copper alloy nut 44. The copper alloy nut 44 is sleeved on a surface of the screw 41, and is threaded to the surface of the screw 41. The bearing seat 43 is sleeved on an upper end of the screw 41. The thrust bearing 42 is sleeved on the upper end of the screw 41, and is located at a lower end of the bearing seat 43. The inner tube group 1 includes an inner tube 11 and a lower end joint 12. The lower end joint 12 is threaded to a lower end of the inner tube 11. The screw 41 is inserted in the inner tube 11 from an upper end of the inner tube 11. A surface of the copper alloy nut 44 is threaded and fixed to the upper end of the inner tube 11.

The copper alloy nut 44 contains, by weight percentage: 75% to 82% of Cu, 9% to 10% of Zn, 5% to 6% of Pb, 3% to 4% of Sn, and further contains: 0.04% of Fe, 0.02% of Ni, 0.01% of Mn, and 0.01% of Sb.

Compared with the prior art, to be specific, compared with a conventional electric linear actuator, in the electric linear actuator for a solar panel of the present invention, the drive nut on the screw 41 uses the copper alloy nut 44. The copper alloy nut 44 used in the present invention greatly improves the strength, toughness, and fatigue-resistance performance and has high hardness and high tensile strength. The copper alloy nut 44 and the screw 41 are used in combination to bear higher pressure and do not fracture easily. Therefore a small-structure high-thrust electric linear actuator can be realized. An electric linear actuator having a smaller volume is used to support the solar panel, so that small space is occupied, and transportation and use become more convenient.

Specifically, the copper alloy nut 44 contains, by weight percentage: 81.14% of CU, 9.62% of Zn, 5.39% of Pb, and 3.81% of Sn. The copper alloy nut 44 further contains, by weight percentage: 0.004% of Mg, 0.003% of S, 0.004% of Cr, 0.006% of Co, 0.009% of Bi, 0.004% of As, and 0.001% of Cd.

With the foregoing solution, in this embodiment, it is found through proportioning tests for a long time that the percentage proportion is an optimal proportion, so that the reduction of area of the copper alloy nut 44 is reduced, the tensile strength and hardness of products are greatly improved, and the service life of nuts is prolonged.

Figure 4:
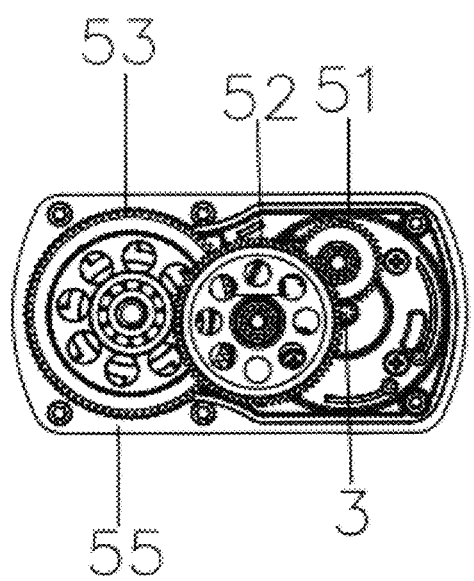
FIG. 4 is a structural schematic of the inside of a gearbox body according to the present invention.

Specifically, referring to FIG. 4, a first gear 51, a second gear 52, and a third gear 53 are fixedly disposed in the gearbox 5. A motor is disposed in the motor group 3. Spiral teeth are disposed on a rotating shaft of the motor. The spiral teeth are meshed with the first gear 51. The second gear 52 is meshed with the first gear 51. The third gear 53 is meshed with the second gear 52. The bearing seat 43 at the upper end of the screw 41 and the center of the third gear 53 are fixed through insertion. The motor drives the first gear 51 to rotate, the first gear 51 in turn drives the second gear 52 to rotate, and the second gear 52 drives the third gear 53 to rotate, so as to enable the screw 41 to rotate.

An upper end joint 54 is further disposed at an upper end of the gearbox 5. The upper end joint 54 is a universal joint, and is fixed to the gearbox 5 through a screw bolt.

The first gear 51, the second gear 52, and the third gear 53 are fixed to the gearbox 5 through bearings.

With the foregoing solution, in this embodiment, a multi-bearing structure is used to support gears, thereby improving the precision and rotational speeds, reducing a friction coefficient, and ensuring the rotation precision.

The screw group 4 further includes a flat gasket 45 and a fixing nut 46. The fixing nut 46 is threaded to a lower end of the screw 41. The flat gasket 45 is sleeved on the lower end of the screw 41, and is located at an upper end of the fixing nut 46.

The high-efficiency high-thrust electric linear actuator further includes a motor winding 6. The motor winding 6 is electrically connected to the motor in the motor group 3 through a cable joint.

In this embodiment, the gearbox 5 further includes a gearbox body 55 and a gearbox cover 56. The gearbox body 55 and the gearbox cover 56 are closed and fixed through a screw bolt, and a cable trough 61 is further disposed on an outer side of the outer tube group 2. A cable is disposed in the cable trough 61. A micro switch 62 is further disposed on a surface of the outer tube group 2. The micro switch 62 is electrically connected to the motor through a cable. A fixing seat 21 is further sleeved on an upper end of the outer tube group 2, and is fixed through the screw bolt.

The copper alloy nut 44 in this embodiment can be applied to conventional electric linear actuators in the art. When the copper alloy nut 44 is used as a drive nut in an electric linear actuator having an equivalent structure, the electric linear actuator can bear higher pressure support solar panels or other members that have larger volumes and weights.

The foregoing is merely description of preferred embodiments of the present invention but is not intended to limit the scope of the present invention. Various variations and improvements made to the technical solutions of the present invention by ordinary skilled in the art without departing from the design spirit of the present invention shall fall within the protection scope as defined by the claims of the present invention.

What is claimed is:

1. A high-efficiency high-thrust electric linear actuator for a solar panel, comprising an inner tube group, an outer tube group, a motor group, a screw group, and a gearbox, wherein the inner tube group is inserted in the outer tube group, the motor group is disposed at one side of the outer tube group, one end of the outer tube group is in drive connection with the motor group through the gearbox, the screw group comprises a screw, a thrust bearing, a bearing seat, and a copper alloy nut, the copper alloy nut is sleeved on a surface of the screw and is threaded to the surface of the screw, the bearing seat is sleeved on an upper end of the screw, the thrust bearing is sleeved on the upper end of the screw and is located at a lower end of the bearing seat, the inner tube group comprises an inner tube and a lower end joint, the lower end joint is threaded to a lower end of the inner tube, the screw is inserted in the inner tube from an upper end of the inner tube, and a surface of the copper alloy nut is threaded and fixed to the upper end of the inner tube; and the copper alloy nut contains, by weight percentage: 75% to 82% of Cu, 9% to 10% of Zn, 5% to 6% of Pb, 3% to 4% of Sn, and further contains: 0.04% of Fe, 0.02% of Ni, 0.01% of Mn, and 0.01% of Sb.

2. The high-efficiency high-thrust electric linear actuator for the solar panel according to claim 1, wherein the copper alloy nut contains, by weight percentage: 81.14% of CU, 9.62% of Zn, 5.39% of Pb, and 3.81% of Sn.

3. The high-efficiency high-thrust electric linear actuator for the solar panel according to claim 1, wherein the copper alloy nut further contains, by weight percentage: 0.004% of Mg, 0.003% of S, 0.004% of Cr, 0.006% of Co, 0.009% of Bi, 0.004% of As, and 0.001% of Cd.

4. The high-efficiency high-thrust electric linear actuator for the solar panel according to claim 1, wherein a first gear, a second gear, and a third gear are fixedly disposed in the gearbox, a motor is disposed in the motor group, spiral teeth are disposed on a rotating shaft of the motor, the spiral teeth are meshed with the first gear, the second gear is meshed with the first gear, the third gear is meshed with the second gear, the bearing seat at the upper end of the screw and the center of the third gear are fixed through insertion, and the motor drives the first gear to rotate, the first gear in turn drives the second gear to rotate, and the second gear drives the third gear to rotate, so as to enable the screw to rotate.

5. The high-efficiency high-thrust electric linear actuator for the solar panel according to claim 4, wherein an upper end joint is further disposed at an upper end of the gearbox, and the upper end joint is a universal joint.

6. The high-efficiency high-thrust electric linear actuator for the solar panel according to claim 4, wherein the first gear, the second gear, and the third gear are fixed to the gearbox through bearings.

7. The high-efficiency high-thrust electric linear actuator for the solar panel according to claim 1, wherein the screw group further comprises a flat gasket and a fixing nut, the fixing nut is threaded to a lower end of the screw, and the flat gasket is sleeved on the lower end of the screw and is located at an upper end of the fixing nut.

8. The high-efficiency high-thrust electric linear actuator for the solar panel according to claim 1, further comprising a motor winding, the motor winding is electrically connected to the motor in the motor group through a cable joint.

* * * * *